United States Patent

Warsager

[15] 3,675,913
[45] July 11, 1972

[54] PIVOTABLE MANDREL
[72] Inventor: Rubin Warsager, 483 Forest St., Kearny, N.J. 07032
[22] Filed: March 27, 1970
[21] Appl. No.: 23,190

[52] U.S. Cl. ..................................269/51, 269/52, 269/73
[51] Int. Cl. .....................B23q 1/04, B23q 3/14, B25j 1/02
[58] Field of Search....................269/47, 48.1, 50, 51, 52, 73

[56] References Cited

UNITED STATES PATENTS

| | | | |
|---|---|---|---|
| 3,547,335 | 12/1970 | Plegat | 269/73 X |
| 3,309,256 | 3/1967 | Warsager | 156/542 |
| 1,938,194 | 12/1933 | Rader | 269/52 X |
| 2,669,014 | 2/1954 | Neilsen | 269/52 |
| 2,909,137 | 10/1959 | O'Neal | 269/52 |
| 3,298,700 | 1/1967 | Vogeleer | 269/52 X |

FOREIGN PATENTS OR APPLICATIONS

| 2,688 | 6/1881 | Great Britain | 269/47 |
|---|---|---|---|

*Primary Examiner*—Wayne A. Morse, Jr.
*Attorney*—Lewis H. Eslinger, Alvin Sinderbrand and Curtis, Morris and Safford

[57] ABSTRACT

A hinged mandrel which pivots to allow a narrow-necked bottle to be placed thereon. The mandrel pivots to form a straight-line portion where it is normally curved and the narrow-necked bottle is placed thereon. When the bottle is over the mandrel, the bottle is returned to a horizontal position and the mandrel is conveniently positioned therein.

3 Claims, 5 Drawing Figures

PATENTED JUL 11 1972
3,675,913
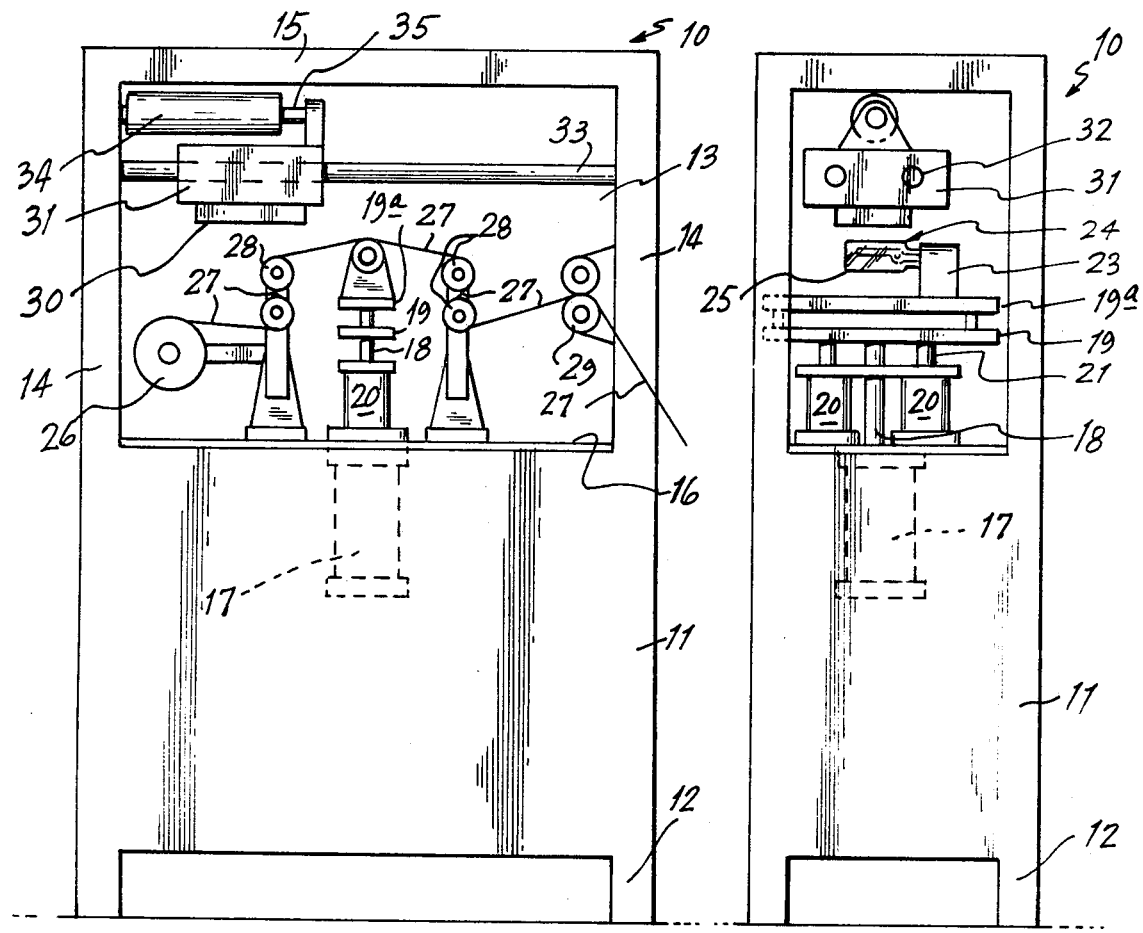
FIG. 1  FIG. 2.
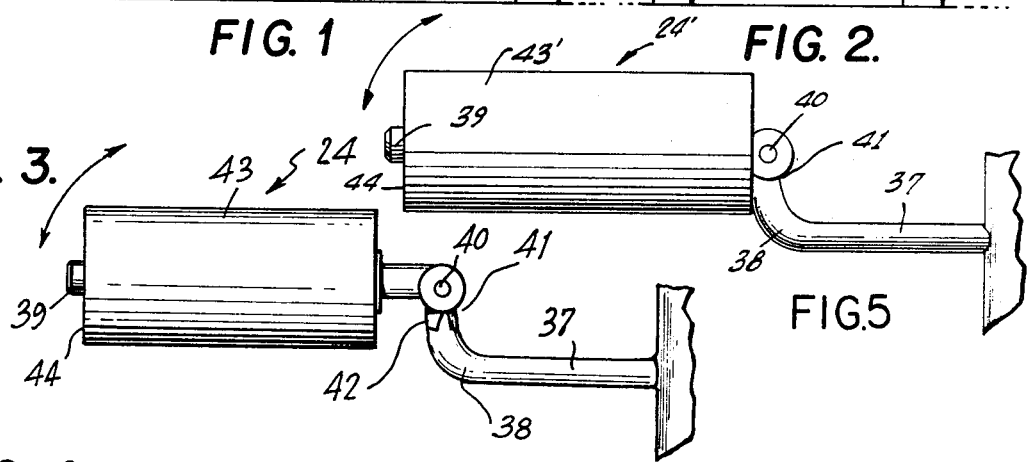
FIG. 3.
FIG. 5
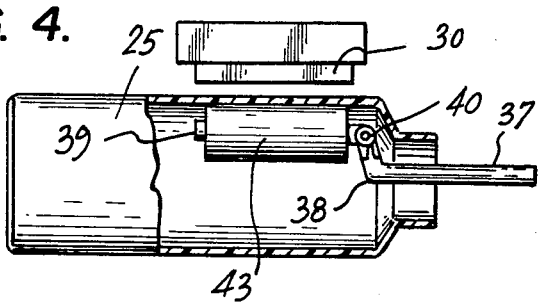
FIG. 4.
INVENTOR
ROBIN WARSAGER
BY
ATTORNEY

PIVOTABLE MANDREL

This invention relates to the surface decoration of hollow objects which can be readily collapsed by an outside force.

A machine for the surface decoration of hollow objects has been successfully developed and is depicted in my U.S. Pat. No. 3,309,256 entitled "APPARATUS FOR SURFACE DECORATING OF ARTICLES" issued on March 14, 1967. This patent discloses a machine for hot stamping via heat and pressure a foil onto the surface of an object to be decorated. To accomplish this, an object is pressed against the foil and a die. To prevent the object, such as a plastic bottle from collapsing under the pressure, a mandrel is placed inside the object and the object is rotated around the mandrel. The face of the mandrel provides a surface support for the object at the point where the object is being pressed against the die.

Generally, the mandrel must have an L-shaped forward portion in which the object rests on the long leg of the "l" and a shaft holding the L-shaped end comes off the shorter leg. The end of the mandrel, therefore, conforms in a general fashion to the outer contour and neck of a bottle. In certain bottles having a narrow mouth, it is very difficult if not impossible to place a bottle on the mandrel. It, therefore, became necessary to design various shapes of mandrels for each size bottle. This required one to maintain a large stock of mandrels with its concomitant expense. It required constant changing of mandrels on the hot stamping machine and a good deal of operator time was lost.

To overcome the aforementioned disadvantages, a mandrel was developed having a hinged portion thereon. By using a hinged mandrel the L-shape can be changed into an *l*-shape. It is patently obvious that it is much easier to insert a bottle over an *l*-shape then and L-shape because the leg of the "L" is an impediment.

It is therefore an object of this invention to provide a universal mandrel which will accept bottles of any size.

It is another object of this invention to provide a mandrel having a hinged portion thereon.

It is another object of this invention to provide a universal mandrel which is inexpensive to manufacture and simple to operate.

These and further objects of the invention will appear from a reading of the following detailed description of a preferred embodiment of the invention to be read in conjunction with the accompanying drawings wherein:

FIG. 1 is a front view of a stamping machine incorporating the invention;

FIG. 2 is a side view thereof showing the mandrel supporting an object to be decorated;

FIG. 3 is a detail view of the mandrel, and

FIG. 4 is a detail view showing a mandrel within a bottle to be decorated; and

FIG. 5 is a detailed view of another embodiment of the mandrel.

For the purpose of illustrating the present invention, a specific type of hot stamping machine is disclosed. It should be understood, however, that the aspects of the present invention are applicable to various types of stamping machines well known to those skilled in the art, and it is not intended to limit the present invention to the specific type of machine illustrated.

Referring now to the drawings, there is illustrated a hot stamping machine generally designated at 10. The housing 11 for the machine is preferably formed of a heavy guage metal, however, any known material can be used. The machine can be raised off the floor by means of legs 12 or the machine can rest flat on the floor. In either case the machine is firmly anchored to preclude lateral movement of the latter.

The work area 13 is an open area extending from front to rear of the machine and is defined by the side rails 14, a top rail 15 and a rigid horizontal bed 16. Securely fastened to the bed 16 is an air cylinder 17 which is supplied by an outside source (not shown) with air under pressure. The air cylinder 17 has a diaphragm therein (not shown) and air can be fed into the cylinder either above or below the diaphragm. A shaft 18 extends out of the cylinder 17 and is rigidly fixed to the diaphragm. Thus, as the diaphragm moves in an upward or downward direction, the shaft 18 moves correspondingly therewith.

The end of the shaft 18 is fixed to a platform 19 which is constrained to move in a vertical direction only corresponding to movement of the shaft 18. A pair of elevator guides 20 having longitudinal bores therein for the reception of a shaft 21 are provided to supply rigidity and stability to the platform 19, 19a. The shafts 21 are free to move in their respective bores and are designed to have a close sliding fit. By utilizing these elevator guides, the platform 19 is firmly constrained to vertical movement without any lateral rocking of the platform. The platform 19 can include an upper part 19a rigidly held to the lower part 19, by posts 22 or it can be a unitary platform.

Mounted on top of and securely fastened thereto is a housing 23 which can have gears therein. An arm 24 which can be in the form of a mandrel is rotatably secured to the housing 23 whereby the arm is free to rotate or it can be positively driven through a gear arrangement within the housing 23. The object 25 to be decorated is placed on the mandrel 24 such that it can be either rotated or held stationary thereon.

A reel 26 is rotatably mounted on the housing 10 and a tape 27 is wound on the reel. The tape is preferably Mylar having a foil thereon which is to be transferred in the form of a decorative design to the object 25. The tape 27 is passed over a plurality of tape guides 28. Four guides are shown, however, the number used is a matter of choice. The guides 28 are preferably rollers having a low coefficient of friction and having flanged ends to prevent the tape from moving laterally from the roller. The tape 27 is threaded around the left set of guides 28 as illustrated in FIG. 1 and thence between the object 25 and a die 30 where it is subsequently passed over the right set of guides. The tape 27 is then fed between a pair of pull rollers 29. These rollers have a surface thereon having a relatively high coefficient of friction or any type of known surface which will grip the tape, for example, a knurled surface can be applied to the rollers. The rollers 29 are rotatably mounted on the housing 10 and can be driven by a motor (not shown) or they can be actuated by hand to advance the tape 28 after the foil carried by the tape has been transferred to the object 25. Thus, by rotating one or both of the rollers 29, a positive grip is exerted on the tapes 27 and it is pulled to the right as shown in FIG. 1 so that a fresh portion of tape having foil thereon is placed between the object 25 and the die 30 for each new object placed on the mandrel 24.

The die 30 can have a design etched thereon or it can be plain according to the desires of the user and depending upon how be wishes to decorate the object 25. The die 30 is fixed to a carriage 31 having openings 32 bored therein for the reception of a pair of guide rails 33. The carriage 31 is freely slidable on the guide rails 33 under the influence of an air cylinder 34 or any other motor means. An arm 35 is fixed at one end thereof to the carriage 31 and at its opposite end to a rod 36. A piston in the air cylinder 34 is fixed to the rod 36 and under the influence of air pressure the rod 36 is moved to the right as shown in FIG. 5; thus, the die is moved therewith to contact the tape 27 and the object 25. The die 30 is preferably heated by electrical means (not shown) and by applying heat and pressure to the tape and the object, the foil on the tape can be transferred to the object.

Referring now to FIG. 3, the mandrel 24 is mounted on a shaft 37. The shaft is provided with a gently curved portion 38 to which the end of the mandrel leg 39 is hinged. The hinged connection comprises a pin 40 which rotatably joins the leg 39 with the curve portion 38 of the shaft 37. The leg 39 can be raised vertically so as to be axial alignment with the curved portion 38 of the shaft. Downward movement of the mandrel past a position at approximately ninety degrees to the curved portion 38 is prevented by an abutment 41 on the curved portion 38 which precludes further movement of the depending tab 42 which is fixed to the leg 39. A roller 43 is freely rotatably journalled on the leg 39. The roller 43 can be made of any material, however, it has been found that a plastic material works well such as the urethanes. The roller 43 can be maintained on the leg 43 by end washers 44. If desired, the depending tab 42 can be eliminated and the roller can extend rearwardly until it engages the curved portion 38, as seen in FIG. 5, wherein like numerals represent like parts. The roller 43' will then prevent the leg 39 from making any angle smaller than approximately ninety degrees with the curved portion 38.

In actual operation, a small mouthed bottle 25 such as depicted in FIG. 4 is placed over the roller 43. The bottle is then lifted upwardly whereupon it lifts the leg 39 upwardly until the leg is in axial alignment with the curved portion 38. The bottle 25 is then pushed over the curved portion 38 until the edge of the mouth of the bottle engages the shaft 37. At this point, the bottle 25 is lowered and it can be further pushed over the shaft 37 when the bottle reaches its full downward position. The depending tab 42 hits the abutment 41 or the edge of the roller hits the curved portion 38 of the shaft to prevent the leg 39 from going beyond the ninety degree position depicted in FIG. 3.

As the object 25 is pressed against the die 30, the roller on the leg 39 engages the inner surface of the bottle and prevents it from collapsing. The object 25 is free to rotate on the roller 43.

While there has been shown and described a particular embodiment of this invention, it will be obvious to those skilled in the art that various changes and modifications can be made therein without department from the invention, and therefore, it is intended in the appended claims to cover all such changes.

What is claimed is:

1. A mandrel for use in a machine adapted to apply decorative material to a hollow object comprising, a shaft, having an offset portion, said shaft being rigidly secured to said machine at the end thereof opposite said offset portion, a leg pivotally secured to said offset portion for movement between a first position wherein said leg is in axial alignment with said offset portion and a second position wherein said leg extends generally perpendicularly to said offset portion, and a roller rotatably mounted on said leg, said roller being dimensioned to abut against said offset portion when said leg is in its second position thereto be prevent said leg from pivoting beyond said second position, whereby the hollow object is readily placed over said leg and offset portion in the first position of said leg and is supported on said roller in the second position of said leg during application of said decorative material thereto.

2. A mandrel as defined in claim 1 in which said leg and offset portions are joined by a pin.

3. A mandrel as defined in claim 1 in which said offset portion is gently curved to join said shaft.

* * * * *